United States Patent [19]

Latta

[11] 4,117,457
[45] Sep. 26, 1978

[54] LIGHT DETECTION AND SIGNALING SYSTEM

[76] Inventor: John S. Latta, 9217 Liptonshire, Dallas, Tex. 75238

[21] Appl. No.: 669,677

[22] Filed: Mar. 23, 1976

[51] Int. Cl.$^2$ ............................ B62J 5/00; H05B 37/02
[52] U.S. Cl. ........................... 340/134; 315/149; 315/155; 315/200 A; 250/201
[58] Field of Search ................ 315/149, 150, 152, 158, 315/157, 155, 156, 200 A, 159; 250/209, 201; 340/52 R, 52 H, 134, 84, 87; 180/98

[56] References Cited

U.S. PATENT DOCUMENTS

| | | | |
|---|---|---|---|
| 3,160,757 | 12/1964 | McAllise | 250/209 |
| 3,601,614 | 8/1971 | Platzer | 250/209 |
| 3,790,848 | 2/1974 | Lai | 315/155 |
| 3,965,388 | 6/1976 | Brisk | 315/155 |
| 3,989,980 | 11/1976 | Berman | 315/158 |

FOREIGN PATENT DOCUMENTS 382,120  8/1973  U.S.S.R. .............................. 340/114 R

*Primary Examiner*—John W. Caldwell, Sr.
*Assistant Examiner*—Donnie L. Crosland
*Attorney, Agent, or Firm*—Richards, Harris & Medlock

[57] ABSTRACT

A light detection and signaling system for attachment to a bicycle, pedestrian, or to any other object. The system includes a housing having a first photosensitive surface mounted therein for detecting the headlights of a vehicle approaching from any direction. The system further includes at least one light source mounted for visibility, along with circuitry responsive to detection of the vehicle headlights for illuminating the light source. A second photosensitive surface may also be provided to receive largely ambient light and to be nonresponsive to the lights of an approaching vehicle, along with circuitry to allow the illumination of the light source only when the second photosensitive surface detects the absence of a predetermined level of ambient light.

8 Claims, 9 Drawing Figures

LIGHT DETECTION AND SIGNALING SYSTEM

FIELD OF THE INVENTION

This invention relates to detection and signaling systems, and more particularly relates to a system for detecting the lights of an approaching vehicle and for signaling the approach of the vehicle.

THE PRIOR ART

Problems have long existed in maintaining adequate visibility at night or dusk between a vehicle and objects such as another vehicle or a stationary obstacle. In particular, problems have heretofore arisen in maintaining visibility between an automobile and a physically small unit such as a bicycle or motorbike having a size and maneuverability such as to present a potential safety hazard if it is not seen by the other automobile operator. Attempted solutions to this visibility problem have included reflectors, lights and flags carried by the bicycle or motorbike, along with light colored reflecting clothing for the rider.

However, none of these solutions heretofore proposed has been completely satisfactory. For example, reflectors, while having the advantage of being passive devices and requiring only incident ambient energy, generally reflect incident light back in a narrow angle and are thus effective only in a limited angle and direction. Battery operated lights have heretofore required the operator to turn them on, and are thus subject to human error. Moreover, battery operated lights often do not provide a light output of sufficient intensity for good visibility and in many cases do not provide light radiation over 360° in the horizontal plane. Flags and other wind driven reflective objects have an advantage of being passive and of varying the reflected light via motion, but have the substantial limitations of low reflection efficiency and undesirable directionality. Moreover, previous indicator devices have generally not provided the rider of the bicycle or motorbike with an indication of an approaching vehicle, and have not had the ability to indicate the distance or speed of an approaching vehicle.

Systems have been heretofore proposed wherein lights are illuminated upon the detection of approaching vehicle headlights. For example, U.S. Pat. No. 1,774,457, issued Aug. 26, 1930 discloses a technique for illuminating a roadside sign only at night in response to vehicle headlights. U.S. Pat. No. 3,893,000 issued July 1, 1975 teaches illuminating highway lighting upon the passage of a vehicle. Similarly, barricade flashers have been heretofore proposed which have circuitry for controlling the power applied to the lamp in order to lengthen the battery life. However, none of the aforedescribed systems have been adaptable for use with a two wheel vehicle, and have not been suitable for use as a safety device which is automatically operable only at dusk or at night in addition to providing an indication both to the rider of the two wheeled vehicle and to the driver of the approaching motor vehicle of the existence of the two wheeled vehicle. Moreover, such previously developed systems have not provided an indication of the distance or rate of speed of the approaching motor vehicle to the rider of the two wheeled vehicle.

SUMMARY OF THE INVENTION

In accordance with the present invention, a light detection and signaling system includes a first photosensitive surface having a configuration responsive to localized light sources emanating from any point in a horizontal plane surrounding the first surface. A second photosensitive surface is disposed to receive largely ambient light and to be nonresponsive to localized light sources in the horizontal plane. The system includes at least one light emitting device. Circuitry is provided to control the output of the light emitting device in response to light incident on the first and second photosensitive surfaces, such that the light emitting device is selectively illuminated when the first photosensitive surface detects a localized light source and the second photosensitive surface detects the absence of a predetermined level of ambient light. Thus, no human intervention is required to turn the system on and off.

In accordance with another aspect of the invention, a light detection and signaling system for attachment to a bicycle or a motorbike includes a housing for being securely attached to the bicycle. A first photosensitive surface is mounted within the housing for detecting the headlights of a vehicle approaching from any direction. At least one light source is mounted on the bicycle for visibility by the rider of the bicycle and by the driver of the approaching vehicle. Circuitry is responsive to detection of vehicle headlights by the photosensitive surface for illuminating the light source to alert both the rider and the driver.

In accordance with yet another aspect of the invention, a light detection and signaling system for attachment to a pedestrian or the like includes a housing for being carried on the body of a pedestrian. A first photosensitive surface is mounted in the housing for detecting the headlights of an approaching vehicle. A light source is mounted in the housing for view by the pedestrian and by the driver of the approaching vehicle. Circuitry is responsive to detection of headlights by the first photosensitive surface for causing flashing of the light source to warn the pedestrian and the driver of the vehicle.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
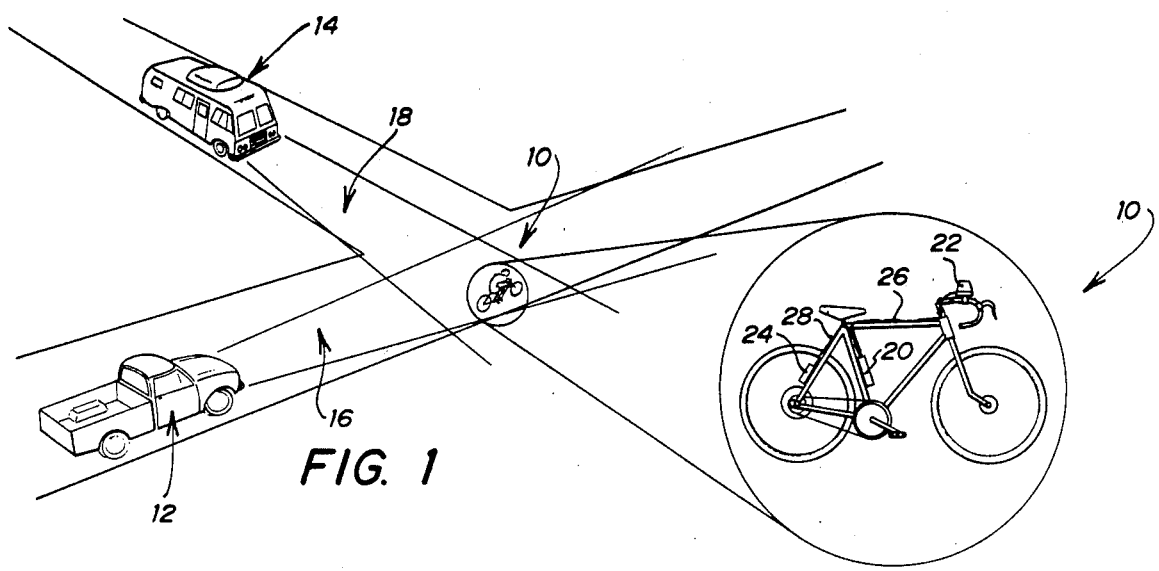
FIG. 1 is a somewhat diagrammatic view of the present invention employed upon a bicycle.

Referring to FIG. 1, a somewhat diagrammatic illustration of a typical utilization of the present invention is illustrated. The present invention is mounted on a bicycle generally identified by the numeral 10 which is being pedaled along the side of a highway. A first motor vehicle 12 is shown approaching the bicycle 10 from one direction, while a second vehicle 14 is shown approaching the bicycle from the second direction. The light condition is assumed to be dusk or after sunset, such that motor vehicles 12 and 14 are directing headlight beams 16 and 18 toward the bicycle 10. With the use of the present invention, flashing lights are generated from the bicycle 10 which warn the drivers of the vehicles 12 and 14 of the bicycle 10, and which also warn the rider of bicycle 10 of the approaching vehicles.

FIG. 1 illustrates an enlarged view of the bicycle 10, illustrating the headlight detecting and control unit 20, along with a front light 22 and a rear light 24. Wires 26 connect the control unit 20 with light 22, while wires 28 connect the control unit 20 with the light 24.

In operation of the present system, photosensitive surfaces in the control unit 20 detect the presence of either or both of the headlights 16 or 18. The lights 22 and 24 are thus energized to flash. An important aspect of the present invention is that the rate of flashing of the lights 22 and 24 varies in dependance on the distance from the motor vehicle to the bicycle 10. As the rate of flashing increases, it indicates to the rider of the bicycle that the vehicle is coming closer. As will be subsequently described in detail, circuitry may be provided in order to provide a display of the relative distance of the vehicle from the bicycle along with the approximation of the speed of the vehicle.

Figure 2:
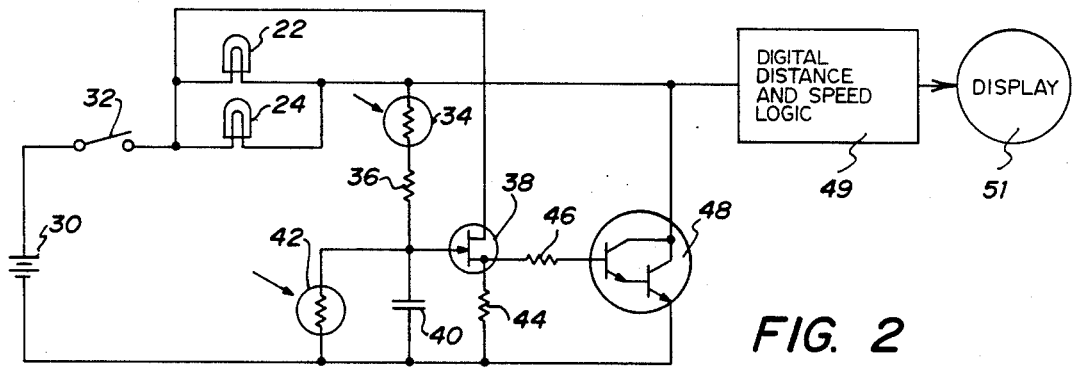
FIG. 2 is an electrical schematic of the preferred embodiment of the present invention.

FIG. 2 illustrates a schematic diagram of the preferred electrical system. A battery 30 is connected through an off-on switch 32 to energize the lights 22 and 24 (FIG. 1). Lights 22 and 24 are connected in parallel and are connected at one terminal to a photosensitive resistance 34 which is connected in series with a fixed resistance 36 to the gate of a unijunction transistor 38. The other terminals of the lights 22 and 24 are directly connected to one of the drains of the unijunction transistor 38. A capacitor 40 is tied across the gate of the transistor 38 and circuit ground. A second photosensitive resistance 42 is connected across capacitor 40.

An output from transistor 38 is provided across a resistor 44, which is tied through a resistor 46 to a Darlington amplifier 48 which includes two transistors connected in a Darlington configuration. A terminal of the Darlington amlifier 48 is connected directly to the parallel connected lights 22 and 24. The photosensitive resistor 42 is oriented so as to be primarily sensitive to ambient light. The photosensitive resistor 34 is oriented so as to be responsive to direct incident light directed primarily along the horizontal plane.

In operation of the circuitry shown in FIG. 2, if switch 32 is closed and the photosensitive resistor 42 senses a low level of ambient light, when the photosensitive resistor 34 detects incident light the circuit generates short duration high current pulses through the resistor 44. The pulses are applied through the Darlington configuration 48 to energize the lights 22 and 24 to provide short pulses of light. The pulse repetition frequency of these pulses is primarily controlled by the resistance of the photosensitive resistor 34, inasmuch as the resistance 42 is high due to the low ambient light level. As the resistance of the photosensitive resistor 34 is a function of the magnitude of light impinging thereon, the pulse repetition frequency increases as the magnitude of incident light increases. As will be subsequently described, any non-zero value of pulse repetition frequency is a direct measure of the relative distance to the light source, since the light incident on the source from a source at a distance is known to be approximately inversely proportional to the square of the distance. Further, the time rate of change of the pulse repetition frequency, or its first derivative, is also a measure of the velocity of the light source relative to the present system.

An important aspect of the invention is then that the drivers of approaching motor vehicles may see a flashing light to clearly identify the location of the bicycle 10. Further, the rider of the bicycle is provided with a flashing light 22 which indicates to him that a motor vehicle is approaching. By watching the rate of flashing of the light, the rider of the bicycle may be provided with an indication of the closeness of the motor vehicle and the speed of the motor vehicle. The lights 22 and 24 are particularly located so as to be on a direct line of sight to each nearby driver of a motor vehicle.

The photosensitive resistor 42 is connected to the circuit, such that when the general ambient light level is at least as great as the light incident upon the photosensitive resistor 34, the flash rate of the oscillator circuitry is reduced to zero. In this state, the system is converted to a very low power consumption state, with power loss occurring only because of the resistances of resistor 44 and the interbase resistance of transistor 38. The system is not thus required to be on when ambient light is available to provide adequate visibility, such as in daylight or on well lighted streets or parking lots. However, when the system is placed in low light level environments, the invention automatically becomes energized in order to provide a flashing indication of the existence of the system.

Further referring to FIG. 2, also attached to the output of the Darlington amplifier 48 is a digital speed and distance logic circuit 49 which operates a display 51. Circuitry 49 quantitatively measures the speed of the approaching motor vehicle. Although the power density from a light source is inversely proportional to the square of the distance $x$ from the source, at a great distance of, for example 250 feet, a good linear approximation can be made of the form:

$$x = a_1 P + b, \qquad (1)$$

where
  $x$ = distance of measurement site from the source.
  $b, a_1$ = constants ($a_1$ being negative)
  $P$ = power density measured at distance $x$ from the source.

In addition, consider a photosensitive surface at a distance $x$ with a light dependant resistance R. Thus, $$P = a_2 R, \qquad (2)$$

where
  $R$ = resistance of phototosensitive surface
  $a_2$ = negative constant which takes into account incidence angle and area of sensitive surface.
  $P$ = incident light power density Next, consider the resistance R above to represent the light dependent resistance of surface 34 in FIG. 2. Capacitance 40 and resistors 34 and 36 form a series RC circuit whose charging rate controls the period T of the oscillator previously described. This is expressed by:

$$RC = a_3 T. \tag{3}$$

where, $R$ = the light dependent resistance of surface 34 plus resistance 36 in ohms.
$C$ = capacitance in farads of capacitor 40
$a_3$ = unitless constant Combining the above-noted relationships and differentiating, the following results:

$$v = x' = (a_1 a_2 a_3 / C) T \tag{4}$$

where $v$ = speed.

A simple method of measuring the period T thus provides a measure of the speed of the light source at a distance $x$. A light source moving with respect to a light dependant variable oscillator such as shown in FIG. 2 at a distance $x$ will cause the pulse rate of the oscillator to vary. As the vehicle approaches, the distance $x$ decreases and the pulses occur more frequently with correspondingly shorter periods T. Allowing $m_1$, $m_2$ to comprise the number of pulses in different time periods $T_1$ and $T_2$ respectively, then the change in the period may be defined as:

$$\Delta T = T_2 - T_1, \tag{5}$$

where $T_2$, $T_1$ = average period in intervals 2, 1 respectively.

$$\text{Now } T_1 = t_s/m_1, \ T_2 = t_s/m_2, \tag{6}$$

where $t_s$ = the duration of the sampling intervals.

$$T' = \Delta T/t_i = t_s/t_i(1/m_2 - 1/m_1), \tag{7}$$

where $t_i$ = time lapse between samples. Hence, $$v = x' = (a_1 a_2 a_3 t_s / C t_i)(1/m_2 - 1/m_1) \tag{8}$$

Letting $M = a_1 a_2 a_3 t_s / C t_i$, then:

$$V = M(1/m_2 - 1/m_1) \tag{9}$$

Hence, the sped may be obtained by counting the number of pulses $m_2, m_1$, taking the reciprocals thereof, and subtracting and multiplying by a positive constant M. Since it is a scale factor, it is clear that the values of certain components of M may be selected to provide a convenient value of M for computational purposes, and that M may be provided with any desired unit of distance such as feet or miles.

Hence, conventional digital logic is provided within the logic circuit 49 to provide the computation of $v = M(1/m_2 - 1/m_1)$ as noted above. This logic need only provide simple counting circuits to detect the rate of flashing of the present system at different time intervals, along with circuitry for taking the reciprocals, and for providing subtracting and multiplying by a constant. The resulting output is applied to the display 51 in order to provide a digital display of the speed of an approaching vehicle. Display may also be provided of the relative distance of the vehicle from the unit.

It will be understood that the present distance and speed logic circuitry shown in FIG. 2 may also be utilized on the side of a road in a stationary configuration to provide a visual indication of the speed of an approaching vehicle, or in any other desired environment.

Figures 3, 4:
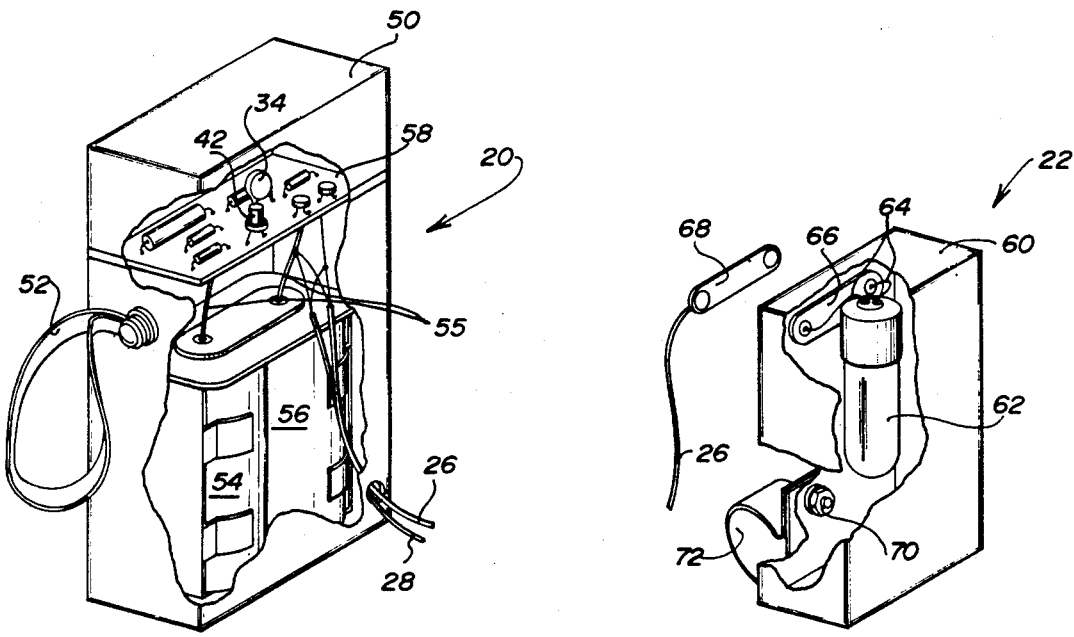
FIG. 3 is a partially broken away view of a housing employing the electrical circuitry shown in FIG. 2.
FIG. 4 is a partially broken away view of the light unit of the preferred embodiment of the invention.

FIG. 3 illustrates one embodiment of the control unit 20. The control unit 20 may be seen to include a housing 50 which may be comprised of lightweight plastic or the like. The housing 50 may be attached to the bicycle by means of a strap 52 which may comprise for example the TS5H strap manufactured and sold by Burndy Corporation. Strap 52 is connected to the housing 50 by a suitable machine screw, lock washer and nut. A battery clip 54 is located in the lower portion of the housing 50 and holds four pen light double-A size batteries 56 in the conventional manner.

A printed circuit board 58 is disposed in the upper portion of the housing 50 and includes the components shown in the schematic of FIG. 2.

The top portion of the housing 50 is formed from transparent plastic so as to allow the passage of light therethrough. The photosensitive resistor 34 is shown as being disposed to receive instant light from any point along a horizontal plane. The photosensitive resistor 42 is shown as being oriented to be primarily responsive to ambient light. Power to the circuitry is provided to wires 55 connecting to the battery and wires 26 and 28 are shown leading from the housing 50 to the lights 22 and 24 previously described. The printed circuit board 58 is suspended within the top of the housing 50 by the use of clear or transparent rigid plastic resin.

FIG. 4 illustrates a preferred embodiment of the light 22 or 24 previously shown in FIG. 1. The light includes a clear or colored transparent plastic housing 60 within which is mounted a lamp 62. Wires 64 extend from the lamp 62 through a metal clip contact member 66 which is adapted to mate with a connector clip 68. Wires 26 extend from the clip 68 to the control unit 20. A metal machine screw 70 is cast within the plastic housing 60 and includes a threaded portion which passes through holes in a metal strap 72 which may be attached to a suitable tubular frame member on the bicycle 10 in a conventional manner. The light 62 is preferably of a high intensity type. If desired, a lamp unit rated lower than the applied voltage can be utilized to achieve a brighter flash.

Figure 5:
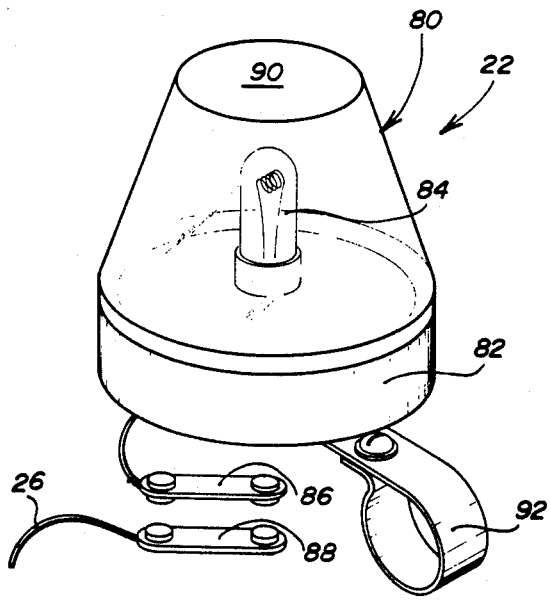
FIG. 5 is an illustration of an alternate embodiment of a light source according to the invention.

FIG. 5 illustrates another embodiment of light 22 which comprises a truncated conical clear plastic cover 80 and a lower cylindrical body 82. A filament lamp 84 is mounted within the light and is connected through suitable wires to a contact clip 86 which is adapted to mate with a clip 88. The top 90 of the housing 80 may be coated with a reflected surface to restrict light emission to a horizontal plane perpendicular to the axis of the light 84 and to increase the intensity thereof. The lamp may be connected to a tubular member of a bicycle by clip member 92 or by any other suitable mounting technique.

Figure 6:
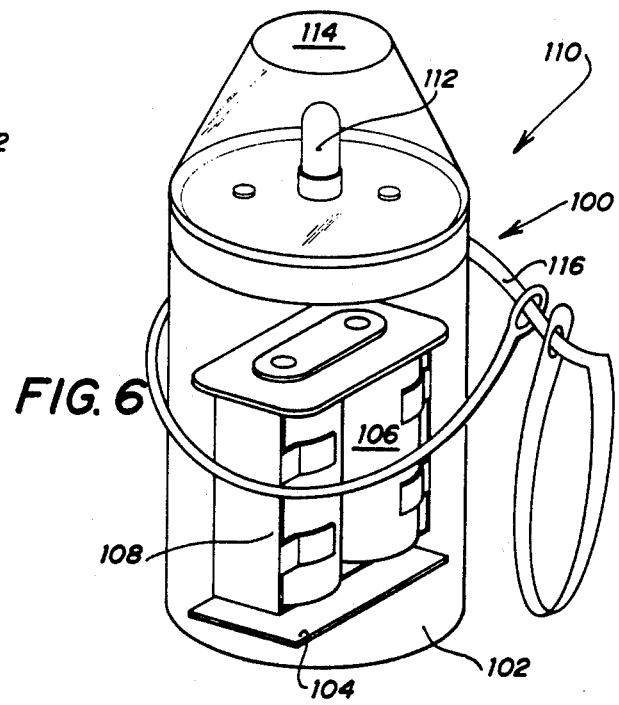
FIG. 6 is an alternate embodiment of the invention for being carried by a pedestrian.

FIG. 6 illustrates an embodiment of the invention suitable for carrying by pedestrians or by the operator of a vehicle whose vehicle is disabled. Alternatively, this embodiment may be placed in a stationary position. This embodiment of the invention comprises a cylindrical housing 100 having a lower portion 102 which is light transparent. A circuit board 104 may comprise circuit boards similar to that shown in FIG. 3 and includes the two photosensitive surfaces previously noted, along with the other components of the electrical schematic shown in FIG. 2. The components on the electrical circuit board 104 are connected to batteries 106 contained within a battery clip 108. The lower portion 102 may be filled with a transparent material such as a plastic resin to serve as a section of a spherical lens and thereby increases the sensitivity of the photosensitive detector.

A light unit 110 may be constructed similarly in the manner shown in FIG. 5, and includes the lamp 112 which is energized in response to the electrical circuitry contained on the printed circuit board 104 in the manner previously described. The top 114 of the transparent housing may be light reflective to increase the intensity of the reflected light. The top 114 may be snap fit onto the top of the housing 100 or may be attached by screws, if desired. The invention shown in FIG. 6 may be attached by a carrying strap 116 to the wrist or to the belt of the user. Strap 116 may comprise a flexible plastic or leather strap constructed in the manner illustrated.

Figure 7:
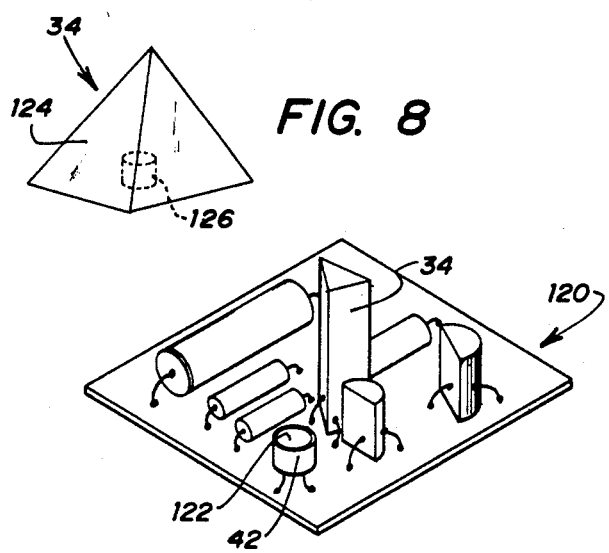
FIG. 7 is a perspective view of a photosensitive circuit in accordance with the invention.

FIG. 7 is a representation of a printed circuit board 120 bearing the components of the electrical circuit shown in FIG. 2. The photosensitive resistor 34 in this embodiment may be seen to comprise an upright three sided member having a triangular cross-section. This configuration thus receives light from any point located on a horizontal plane and picks up the headlights from any motor vehicle approaching from any direction to the bicycle. Conversely, the photosensitive resistor 42 is mounted such that the photosensitive surface 122 thereof is responsive only to light having a primarily vertical component. With the illustrated configuration, the photosensitive resistor 34 is thus responsive to lights from oncoming vehicles, while the photosensitive resistor 42 is primarily responsive only to ambient light in order to turn the system from a low power consumption to a normal operating condition in a dark ambient environment.

It will be understood that the photosensitive resistor 34 may comprise a cylindrical element, or alternatively may comprise a four sided element or the like. The photosensitive resistor 34 is mounted above the remaining components on the board 120 so that the photosensitive surfaces thereof are not blocked from receiving light by the other components.

Figure 8:
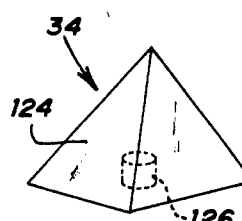
FIG. 8 is a view of a pyramidal light responsive device according to the invention.

FIG. 8 illustrates yet another embodiment for the photosensitive resistor 34. In this embodiment, a clear plastic pyramid 124 is provided, with a photosensitive resistor 126 embedded in the center thereof. Light entering the transparent pyramid body is thus received by the photosensitive resistor to provide the prior described operation of the invention. Light entering nearly normal to the edges of the side of the pyramid is bent so as to be nearly normal to a light sensitive surface of the device 126. Thus, light transmitted through the corners of the pyramid increases the amount of light received by the photosensitive resistor 126 to provide a more sensitive light receiving device.

Figure 9:
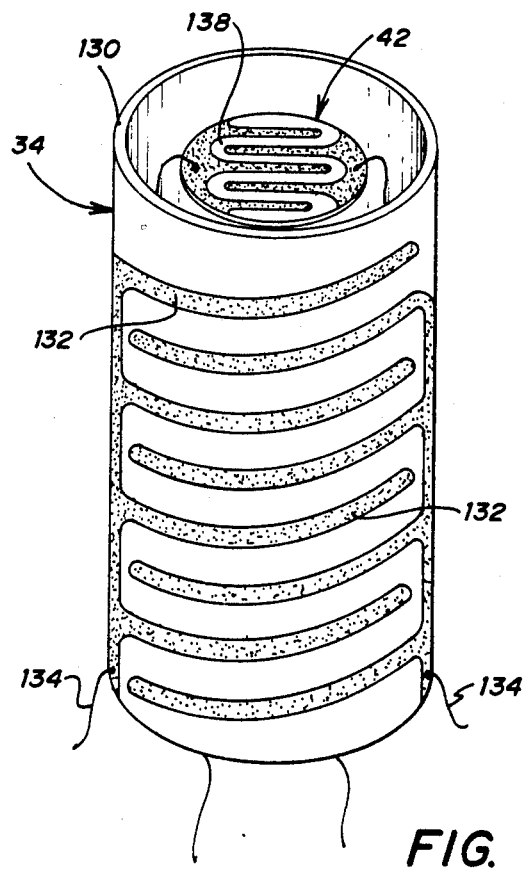
FIG. 9 is another embodiment of the photosensitive surface configuration of the invention.

FIG. 9 illustrates another embodiment of the photosensitive resistors of the invention. In this embodiment, the photosensitive resistor 34 comprises a cylindrical member 130 having a photosensitive pattern 132 formed thereon and connected with output wires 134. A similar pattern is provided on the opposite side of the cylindrical body 130. The cylindrical body 130 thus detects light emanating from any point along the horizontal plane to provide an omni-directional detector. Conversely, the photosensitive resistor 42 comprises a cylindrical member having a photosensitive surface 138 thereon. The photosensitive surface 138 is mounted inside the top portion of the cylindrical member 130 and is oriented generally horizontally, so as to be primarily responsive to ambient vertical light. Light emanating in the horizontal plane would not be generally detected by the photoconductive surface 138.

The present invention may also find application wherein it is desired to mark the location of a driveway or construction site which is hard to see at night. In this case, an embodiment similar to previously described FIG. 6 is placed near or mounted on the object to be marked such as a barricade. As the vehicle with lights approaches the marked location, the operator of the motor vehicle detects a visual flashing light to indicate the location of the barricade. The system will first begin to emit flashes at a given rate as the incident light from the motor vehicle becomes great enough to activate the system. Next, the flash rate progressively increases as the motor vehicle continues to approach the barricade. This increase in flashing rate indicates approaching danger to the driver of the vehicle. The flashing rate finally reaches a maximum as determined by the resistance and capacitance values of the system. This flashing light, along with the change in rate of flashing, attracts the attention of the driver of the motor vehicle and can prevent accidents and the like.

The effective control of flashing signals by the present invention may be further enhanced by choice of ratios of sensitive areas of the photosensitive surfaces 34 and 42. For example, in some applications a small sensitive area of surface 42 relative to area 34 may be used to offset the usually greater intensity of sunlight as compared to light from artificial sources. Further, the effective area of arrangement of surface 42 may be made to approach zero by suitable cover or by recessing the arrangement inside a cylinder as shown in FIG. 9 to even greater depths to achieve a smaller viewing aperture. In some cases the position of the surface 42 may be adjustable within the cylinder shown in FIG. 9 to enable control of operation of the circuitry. In some cases, the sensitivity of the surface 42 may be reduced sufficiently that the system may be made to operate in high ambient light conditions such as full sunlight, if desired. Similarly, in some applications the omni-directional characteristic of surface 34 may be modified by covering selected viewing angles of the device.

Further, the photosensitive surfaces 34 and 42 may be formed from different types of materials. Since tungsten sources are relatively lower color temperature sources, the surface 34 may be made of CdSe, which is photoconductive bulk effect material responsive to lower color temperatures. The second surface 42 may be selected and filtered to be responsive to another part of the light spectrum. This effect would be to render the system more responsive to vehicular lights in varying levels of ambient light than would be the case if no spectral discrimination is employed.

It may thus be seen that the present invention provides many unique and novel features by improving the visibility of moving small vehicles, pedestrians and fixed objects in the vicinity of highways. In addition, the system notifies the rider of the small vehicle or the pedestrian of the presence and approach of a motor vehicle having headlights. The present invention may also indicate how fast the motor vehicles are approaching. The present system enhances the safety feature provided thereby due to the automatic operation to avoid operator negligence in turning on the device at low light environments. The efficiency of conversion of electrical power into visible light signals is enhanced by the pulse control of the light emitting device of the invention. The present photosensitive surfaces used to detect motor vehicle headlights provides 360° coverage in the horizontal plane, thereby eliminating any "blind spots". While the present invention has been particularly described with the use on two wheel vehicles such as bicycles and motor bikes, it will be understood that the present invention may also be utilized to indicate the presence of other objects such as driveway entrances, bridge railings, approach or termination ends of an aircraft runway, parking lot entrances or exits, excavation sites, manholes, road construction area or the like.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for detecting and signaling the presence of a moving localized incident light source having an intensity located at a distance from the system wherein the system and the localized incident light source move with respect to each other, comprising:

a first photosensitive surface for detecting the intensity of the localized incident light source, said first photosensitive surface having a configuration for detecting said intensity of the localized incident light source in a 360° arc contained within a horizontal plane surrounding said first photosensitive surface and for generating a first output signal representative of said intensity of the localized incident light source;

a second photosensitive surface optically isolated from said first photosensitive surface being nonresponsive to the localized incident light source and being substantially responsive to ambient light for generating a second output signal representative of a predetermined level of ambient light;

first circuit means for receiving said first and second output signals of said first and second photosensitive surfaces and for generating a third output signal in response to receipt of both of said first and second output signals;

second circuit means responsive to said third output signal for generating a fourth output signal having a frequency, said frequency of said fourth output signal being directly related to said intensity of the localized incident light source detected by said first photosensitive surface; and means for emitting light connected to said first and second circuit means responsive to said fourth output signal for being selectively illuminated to flash on and off at a variable rate of flash, said flash rate increasing as the distance between the system and the localized incident light source moving with respect to each other decreases.

2. The detection and signaling system of claim 1 and further including:

means for obscuring light from impinging selected portions of said second photosensitive surface for enabling illumination of said means for emitting light in high ambient light conditions.

3. The detection and signaling system of claim 1 wherein said first and second photosensitive surfaces are responsive to different frequency spectrums.

4. The detection and signaling system of claim 1 wherein said first photosensitive surface is disposed within a transparent lens configuration.

5. The detection and signaling system of claim 4 wherein said lens configuration has a pyramidal shape.

6. The detection and signaling system of claim 4 wherein said lens configuration has a spherical shape.

7. The detection and signaling system of claim 1 and further including:

a housing for being securely attached to a two-wheeled vehicle;

said photosensitive surfaces and said circuit means being mounted within said housing for detecting headlights of a motor vehicle approaching said two-wheeled vehicle from any direction; and said means for emitting light being mounted on said two-wheeled vehicle for visibility by the rider of said two-wheeled vehicle and by the driver of said approaching motor vehicle, such that said means for emitting light alerts both the rider and the driver of their approaches.

8. The detection and signaling system of claim 1 and further including:

a housing for being securely attached to a pedestrian;

said photosensitive surfaces and said circuit means being mounted within said housing for detecting headlights of a motor vehicle approaching the pedestrian from any direction; and said means for emitting light being mounted on the pedestrian for visibility by the pedestrian and by the driver of said approaching motor vehicle such that said means for emitting light alerts both the pedestrian and the driver of their approaches.

* * * * *